N. M. DOEN.
AUTOMATIC PNEUMATIC CHUCK.
APPLICATION FILED AUG. 15, 1906.
957,194.
Patented May 10, 1910.
2 SHEETS—SHEET 2.
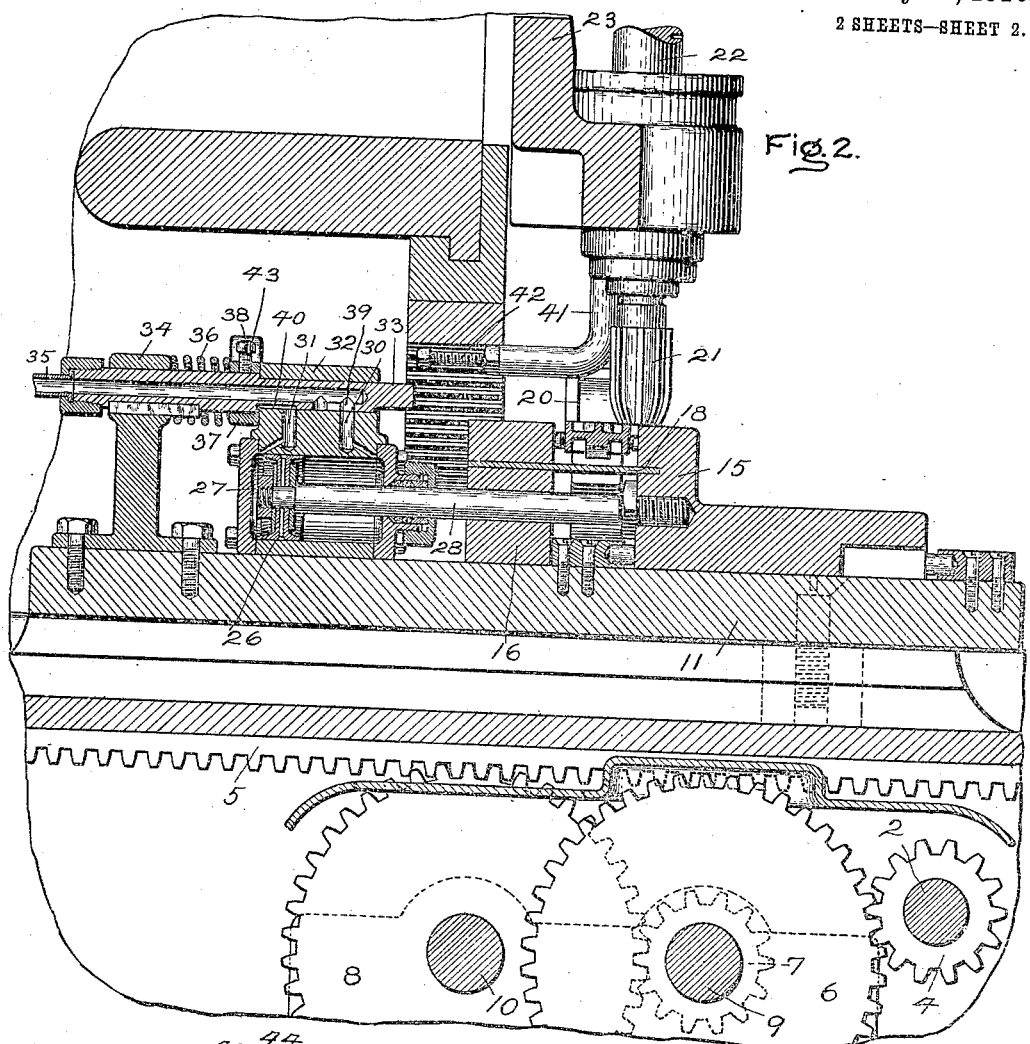
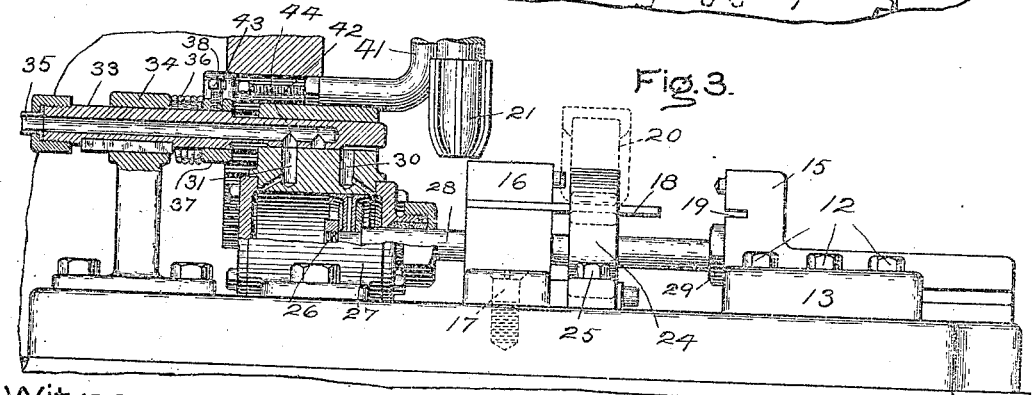
Witnesses:
Inventor,
Nathan M. Doen,

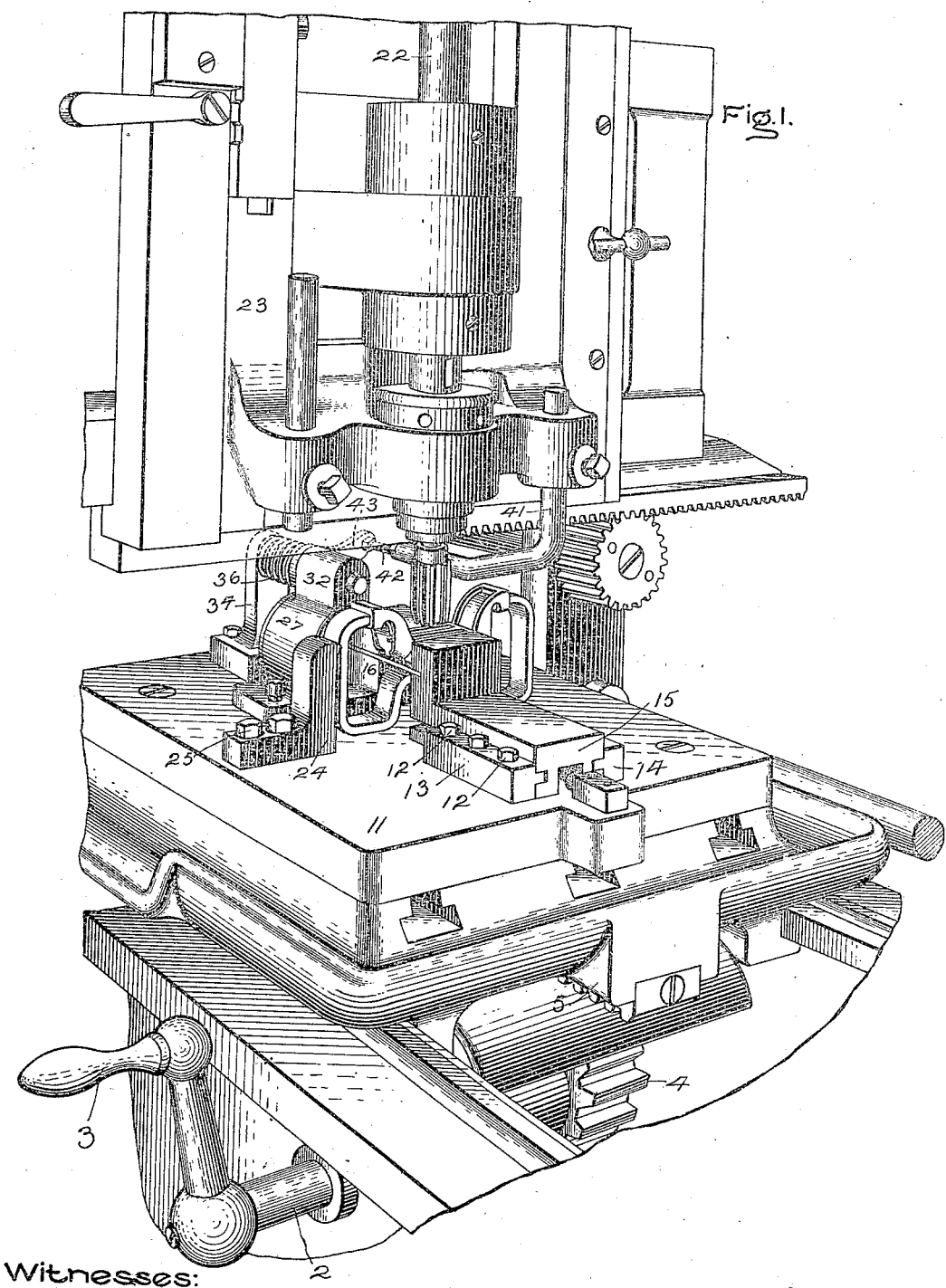

UNITED STATES PATENT OFFICE.

NATHAN M. DOEN, OF LYNN, MASSACHUSETTS, ASSIGNOR TO GENERAL ELECTRIC COMPANY, A CORPORATION OF NEW YORK.

AUTOMATIC PNEUMATIC CHUCK.

957,194.  Specification of Letters Patent.  Patented May 10, 1910.

Application filed August 15, 1906.  Serial No. 330,660.

*To all whom it may concern:*

Be it known that I, NATHAN M. DOEN, a citizen of the United States, residing at Lynn, county of Essex, State of Massachusetts, have invented certain new and useful Improvements in Automatic Pneumatic Chucks, of which the following is a specification.

This invention relates to chucks or holders for work that is to be machined.

The object is to provide a device which will operate quickly and automatically both in opening and closing, will not require special attention from the workman tending the machine, and will not consume any more power when left in operation for a long period of time than for a short period. I attain these results by means of a chuck whose movable jaw is actuated by fluid pressure, preferably compressed air, acting on a movable abutment connected with said jaw, and controlled by a valve which is operated automatically by the movements of the work support, such as the platen of a milling machine which conveys the work to and fro under the cutting tool.

The details of one embodiment of my invention are shown in the accompanying drawings, in which—

Figure 1 is a perspective view of a portion of a milling machine equipped with my improved chuck; Fig. 2 is a longitudinal section showing the chuck closed; and Fig. 3 is a side elevation, partly in section, showing the chuck open.

The milling machine illustrated comprises a frame 1, in which is mounted a horizontal transverse shaft 2 provided with a crank handle 3. A pinion 4 is keyed to the shaft 2 and coöperates with a rack 5, preferably through suitable gears 6, 7 and 8 mounted on the shafts 9 and 10. The chain of gears shown provides an approximate reduction of five to one, and insures a slow reciprocation of the platen 11, when the crank 3 is turned; an overhand rotation away from the operator causing the platen to move backward, and a reverse rotation bringing the platen back again.

Secured to the upper surface of the platen by means of bolts 12, are parallel ways 13 and 14 between which slides the movable jaw 15 of the chuck. The stationary jaw 16 is rigidly fastened to the platen by screws 17, and in the present embodiment of the invention is provided with a horizontal flat tongue 18 extending toward the movable jaw and entering a recess 19 therein, when the chuck is closed. This tongue serves to secure a proper alinement of the work 20, which in this instance is shown as the field-magnet frame of an electric meter, the middle portion of which requires to be milled off smooth, by a rotating cutter 21 carried at the lower end of an upright shaft 22, suitably journaled in bearings secured to the cross-head 23 of the machine. The work may be laterally located by a stop 24 secured to the platen by screws 25.

The movable jaw is connected with a movable abutment, preferably a piston 26 working in a cylinder 27 fastened to the platen in the rear of the stationary jaw. The connection between the piston and the jaw is preferably by means of a rod 28 sliding through a hole in the stationary jaw and threaded into the movable jaw. A lock nut 29 prevents it from working loose.

Ports 30 and 31 connect the two ends of the cylinder with a valve chest 32 in which is a suitable slide valve 33. The chest and valve are preferably cylindrical, as shown, the latter being tubular and adapted to slide in a guide 34 mounted on the platen. A flexible tube 35 conveys compressed air to the interior of the valve. A spring 36 is compressed between said guide and a collar 37 secured on said valve by a set screw 38; said spring urging the valve to the position in which it appears in Fig. 2, with its port 39 registering with the port 30 and one of its exhaust ports 40 registering with the port 31. This position of the valve insures the admission of compressed air to the front end of the cylinder 27 and causes the chuck to close.

Mounted on some stationary part of the machine, such as the cross-head, is an adjustable stop, such as the arm 41, provided with a screw 42. The head of said screw is in line with a lug 43 projecting from the collar 37, and is adjusted to be struck by said lug when the forward movement of the platen has carried the work clear of the milling cutter.

The operation of the device is as follows: Assuming that the ports stand in the position shown in Fig. 3, with the port 44 of the valve registering with the port 31, and the chuck forced open, the operator picks up with one hand the field magnet frame 20 or other work, and slips it upon the tongue 18 until it rests against the stationary jaw and the stop 24. With the other hand he turns the crank handle 3 and runs the platen back under the milling cutter. The spring 36 expands as the guide 34 moves backward, and this causes the valve to shift until, just before the work reaches the cutter, the collar 37 strikes the end of the valve chest, and the further movement of the platen carries the lug 43 away from the stop 42. In this position, as shown in Fig. 2, the valve admits air to the front end of the cylinder, and the movable jaw of the chuck is suddenly closed upon the work, clamping it rigidly against the stationary jaw. The continued backward movement of the platen carries the work under the cutter. The operator then reverses the direction of rotation of the handle 3 and brings the platen forward. As soon as the work has cleared the cutter, the lug 43 strikes the stop 42, and when the valve has been shifted sufficiently by reason of the fact that it is arrested while the valve chest continues moving, the air will be admitted to the back end of the cylinder and the chuck will suddenly open. It will be noted that all the operator has to do is to insert and remove the work, and run the platen to and fro; the chuck closing and opening automatically as the platen travels backward and forward. The form of the jaws may be varied to suit the work, and the tongue 18 and stop 24 may be omitted or altered as desired.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,—

1. The combination with a reciprocating machine tool, of a work holder having a movable jaw, fluid pressure means to move said jaw to full open position and return it into positive engagement with the work irrespective of the thickness thereof, and means actuated by the movements of the machine tool for controlling the movements of said fluid pressure means, said controlling means comprising a valve and a stop on the machine to engage said valve at a given point in the movement of the machine.

2. The combination with a machine tool having a reciprocating platen, of a work-holding chuck having a stationary jaw and a sliding jaw mounted on said platen, a movable abutment responsive to fluid pressure changes connected with said sliding jaw, means for automatically controlling said fluid pressure by the movements of said platen, and comprising a valve, and a stop on the machine to arrest said valve at a given point in the movement of said platen.

3. The combination with a machine tool having a reciprocating platen, of a work-holding chuck having a stationary jaw and a sliding jaw mounted on said platen, a cylinder also mounted on said platen, a piston connected with said sliding jaw, a valve sliding parallel with said platen, a spring actuating said valve in one direction, and a stop on the machine to arrest the valve and compress said spring at a given point in the movement of said platen.

In witness whereof, I have hereunto set my hand this thirteenth day of August, 1906.

NATHAN M. DOEN.

Witnesses:
JOHN A. MCMANUS, Jr.,
PHILIP F. HARRINGTON.